(12) United States Patent
Thumerel et al.

(10) Patent No.: US 12,407,985 B2
(45) Date of Patent: Sep. 2, 2025

(54) METHOD FOR DETERMINING A DIRECTION OF PROPAGATION OF A SOUND SOURCE BY CREATING SINUSOIDAL SIGNALS FROM SOUND SIGNALS RECEIVED BY MICROPHONES

(71) Applicant: IMMERSIVE AUDIO TECHNOLOGIES FRANCE, Saint Herblain (FR)

(72) Inventors: Olivier Thumerel, Nantes (FR); Yohann Simon, Saint Jean de Boiseau (FR); Thierry Heeb, Sainte-Croix (CH)

(73) Assignee: IMMERSIVE AUDIO TECHNOLOGIES FRANCE, Saint Herblain (FR)

( * ) Notice: Subject to any disclaimer, the term of this patent is extended or adjusted under 35 U.S.C. 154(b) by 206 days.

(21) Appl. No.: 18/548,408

(22) PCT Filed: Mar. 2, 2022

(86) PCT No.: PCT/EP2022/055329
§ 371 (c)(1),
(2) Date: Aug. 30, 2023

(87) PCT Pub. No.: WO2022/184800
PCT Pub. Date: Sep. 9, 2022

(65) Prior Publication Data
US 2024/0137702 A1    Apr. 25, 2024
US 2024/0236573 A9    Jul. 11, 2024

(30) Foreign Application Priority Data
Mar. 4, 2021 (FR) ......................... 2102105

(51) Int. Cl.
H04R 5/04     (2006.01)
H04B 17/364   (2015.01)
H04R 3/00     (2006.01)

(52) U.S. Cl.
CPC ............ *H04R 5/04* (2013.01); *H04B 17/364* (2015.01); *H04R 3/005* (2013.01); *H04R 2430/20* (2013.01)

(58) Field of Classification Search
None
See application file for complete search history.

(56) References Cited

U.S. PATENT DOCUMENTS 7,787,328 B2 *  8/2010  Chu ................... H04R 3/005
                                                      367/125
9,426,598 B2 *  8/2016  Walsh ................. H04S 7/301
(Continued)

FOREIGN PATENT DOCUMENTS

FR   3081641 A1    11/2019
JP   2008154130 A   7/2008

OTHER PUBLICATIONS

International Search Report dated Jun. 15, 2022 for corresponding International Application No. PCT/EP2022/055329, filed Mar. 2, 2022.

(Continued)

*Primary Examiner* — Paul W Huber
(74) *Attorney, Agent, or Firm* — David D. Brush; Westman, Champlin & Koehler, P.A.

(57) ABSTRACT

A method for determining a direction of at least one sound source using an audio system capturing by an array of microphones sound emitted by the at least one sound source. The method includes: emitting a sound by way of the at least one sound source; recording sound signals received by the array of microphones; executing cross-correlations between the received signals in order to deduce relative times of arrival therefrom; creating a sinusoidal function of time having a determined frequency and a phase offset dependent on the relative times of arrival; and computing to determine a direction value of the sound source in a spatial reference frame defined by the array of microphones, using the values computed from the sinusoidal function of time at input, presenting the direction value.

16 Claims, 3 Drawing Sheets

(56) References Cited

Figure 1:
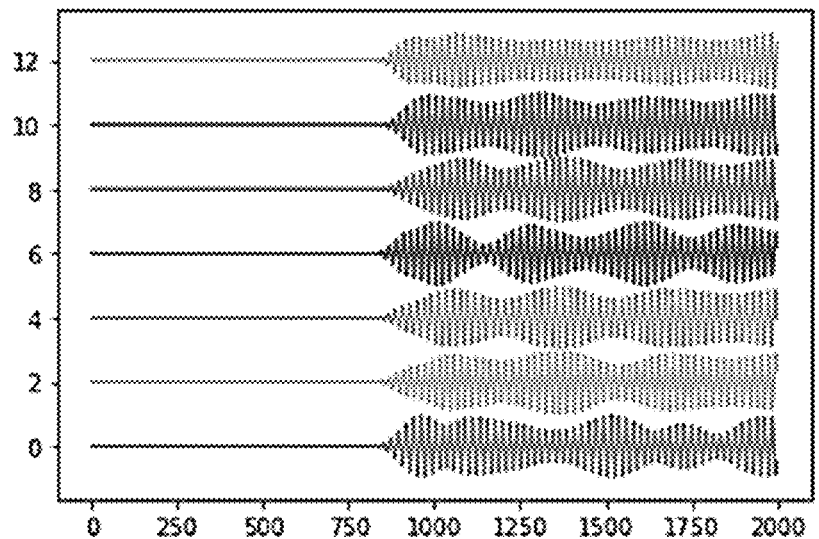

U.S. PATENT DOCUMENTS 9,578,439 B2 * 2/2017 Kim ..................... H04S 3/002
2021/0256990 A1 8/2021 Guerin et al.

OTHER PUBLICATIONS

Written Opinion of the International Searching Authority dated Jun. 15, 2022 for corresponding International Application No. PCT/EP2022/055329, filed Mar. 2, 2022.
English Translation of the written opinion of the French Searching Authority, for Application No. FR2102105, filed Mar. 4, 2021.
English translation of the Written Opinion of the International Searching Authority dated Jun. 15, 2022 for corresponding International Application No. PCT/EP2022/055329, filed Mar. 2, 2022.
Khmou Youssef et al: "Comparative Study between Several Direction of Arrival Estimation Methods", Journal of Telecommunications and Information Technology, Jan. 1, 2014 (Jan. 1, 2014), pp. 41-48, Retrieved from the Internet: https://www.researchgate.net/profile/Miloud-Frikel/publication/274192556_Comparative_Study_between_Several_Direction_of_Arrival_Estimation_Methods/links/5fcf3db7299bf188d4002680/Comparative-study-between-several-direction-of-arrival-estimation-methods.pdf.
Welch, "The Use of Fast Fourier Transform for the Estimation of Power Spectra: A Method Based on Time Aver•• aging Over Short, Modified Periodograms", IEEE Transactions on Audio and Electroacoustics, vol. AU-15, No. 2, Jun. 1967.

* cited by examiner

METHOD FOR DETERMINING A DIRECTION OF PROPAGATION OF A SOUND SOURCE BY CREATING SINUSOIDAL SIGNALS FROM SOUND SIGNALS RECEIVED BY MICROPHONES

1. CROSS-REFERENCE TO RELATED APPLICATIONS

This application is a Section 371 National Stage Application of International Application No. PCT/EP2022/055329, filed Mar. 2, 2022, which is incorporated by reference in its entirety and published as WO 2022/184800 A1 on Sep. 9, 2022, not in English.

2. FIELD OF THE INVENTION

The invention relates to determining the direction of a sound source, such as an acoustic speaker, using an array of microphones. The invention relates more particularly to the fact that relative times of arrival are computed using cross-correlations on the received sound signals and that the determination method uses recreated sinusoidal signals.

3. TECHNOLOGICAL BACKGROUND

The invention applies in particular to determining the direction of arrival in space of sound sources. Very high-performance audio systems comprising a large number of sound sources, such as acoustic speakers, are known. The present invention relates only to the audio side, but this in no way rules out using it in systems that are possibly supplemented by a large screen for reproducing audiovisual works, in other words audiovisual systems.

To improve listening, there are at present numerous standards in order to create a real soundscape around listeners and users of the audio system. This sound artificially generates real immersion in an acoustic environment. To achieve this, the audio system comprises a large number of acoustic speakers that generate sound waves from the location where they are placed. The position of the acoustic speakers depends directly on the sound reproduction standard. In the example of a 5.1 sound produced by a home cinema installation, the five speakers are distributed as follows:
  one in the centre facing the listeners,
  two at the front, to the right and to the left of the listeners,
  two at the back, to the right and to the left of the listeners.

This spatial distribution already affords good rendering of the sound environment, each source emitting a specific sound. The listener thus has the impression that the sound emitted from behind the image is actually coming from this direction.

Audio systems have become more complex over the years and audio standards now take into consideration not only the direction on the horizontal plane (also called the azimuth), but also the elevation of each sound source. When installing an audio system, it is important to correctly position the sound sources in the 3D space around the area where the listeners are located. To this end, audio system manufacturers provide indications in terms of azimuthal angle and elevation angle. An installer of the audio system is then able, from a given point, to plot half-lines having these azimuth and elevation values with respect to the position of the listeners, and position the sound sources on the plot of these half-lines.

It is not always possible to install a sound source at a given location recommended by the manufacturer, quite simply because there is no physical medium at this location. In addition, when the installation is performed in a room, walls and objects generate interference, thereby requiring a robust system in order to determine the position of the acoustic speakers. It is therefore important to model the propagation of sound in an environment and to consider the position of the speakers to be unknown so as then to be able to correct this position or correct the sound emitted by these sources. The position of the acoustic speakers becomes more critical when the audio is associated with a visual document, because the spectator has better perception of directions. Indeed, the listener then has visual markers that make it possible to better evaluate the locations where the sound sources should be located in a 3D environment.

There are nowadays determination systems that make it possible to check whether each sound produced by a source actually comes from the correct direction. These systems implement both hardware in the form of an array of microphones connected to a sound signal acquisition unit and software executing algorithms for determining the direction of a sound source from signals received by said microphones, these algorithms commonly being referred to as "DOA", standing for "Direction of Arrival". The linear estimator known as the "Bartlett" estimator is a simple and proven method among currently known DOA methods. This method works in particular for systems that compute the direction of emission of sinusoidal signals without any noise or deformation, since these signals are sensitive to reverberations and absorption by the environment. Other algorithms use times of arrival ("TOA") of the sound to compute directions of sound sources.

Tests show that, in some environments, the amplitude of acoustic signals captured by microphones varies considerably. FIG. 1 depicts the emission of sinusoidal acoustic signals as are captured by the array of microphones, these signals being digitized and recorded in the audio system. It is possible to observe highly different amplitudes, even though it is the same sound signal emitted by the same sound source, and therefore the use of the results is not satisfactory. Moreover, the emission of a sinusoidal sound is unpleasant to listen to, and a white noise, or pink noise, or simply any noise, is preferable thereto.

Document FR3081641, published on 29 Nov. 2019, describes a system for locating sound sources in a 3D environment. The sound signals make it possible to establish a map of acoustic activity in an N-dimensional space in which the sound sources are located, and to project this map onto an axis so as to limit dimensions and simplify computations.

There is therefore a real need to estimate a direction of a sound source in a 3D environment that provides both good accuracy and better listening comfort in the step of estimating the direction.

4. SUMMARY

An exemplary embodiment of the invention relates to a method for determining the direction of a sound source, this method being characterized in that it comprises the following steps:
  emitting a sound by way of the at least one sound source and recording the sound signals received by an array of microphones, executing cross-correlations between the received signals in order to deduce the relative times of arrival therefrom, creating a sinusoidal function of time having a determined frequency and a phase offset dependent on the relative times of arrival, computing to determine a direction value of the sound source in a spatial reference frame defined by the array of microphones, using the values computed from the sinusoidal function of time at input, presenting the direction value.

The sound emitted by the sound sources thereby has no constraints, and it is able to be made more pleasant for a listener than a sinusoidal sound as recommended by known DOA methods. Moreover, creating signals that are sinusoidal and phase-offset as a function of relative times of arrival and using them as input parameters makes it possible to use these DOA methods effectively.

According to a first embodiment, the direction value comprises an azimuth datum and an elevation datum. The position of the acoustic speaker is thereby determined accurately with respect to the position of the array of microphones.

According to another embodiment, the step of computing to determine the azimuth datum uses sinusoidal signals only of a first frequency at input, and the computation to determine the elevation datum uses sinusoidal signals of a second frequency at input.

The creation of the two sinusoidal functions is thereby adapted to the computation of the azimuth and the elevation.

According to another embodiment, the first frequency is in the interval between 3000 Hz and 3800 Hz, and the second frequency is in the interval between 6000 Hz and 6800 Hz. The accuracy of the computation of the azimuth and the elevation is thereby improved.

According to another embodiment, the step of executing cross-correlations between the signals received from the microphones comprises a first step of cross-correlation over the entire duration of the recording in order to deduce a correlation maximum value therefrom, and a second step of cross-correlation around the correlation maximum value using oversampled data obtained from the recording of the sound signals. The accuracy of the direction values is thereby further improved.

According to another embodiment, the step of computing to determine a direction value comprises Bartlett's method. The method thereby uses a proven method to compute the azimuth and elevation values.

According to another embodiment, the method comprises a polynomial interpolation step executed after the cross-correlation steps and consisting in applying a second-order polynomial to the data resulting from the step of cross-correlating the samples of the sound that are located before and after the correlation maximum. The accuracy of the computation of the azimuth and the elevation is thereby improved.

According to another embodiment, the method comprises a step of determining the top and the bottom, using an additional microphone located outside the plane in which the other microphones are located. It is thereby possible to assign a sign for the elevation values.

According to another embodiment, the sound emitted by the at least one sound source is white or pink noise. This sound is thereby insensitive to interference from the environment and is more pleasant to listen to.

According to another embodiment, the method comprises the following additional steps:

selecting an audio standard that defines the direction of at least one sound source with respect to the location where a listener is supposed to be located, retrieving target positions of each sound source, associated with the selected audio standard, computing the difference between the computed direction values and the retrieved values and comparing the difference between the values with a threshold value, selecting a strategy depending on whether the value of the difference is less than or greater than the threshold value, said strategy aiming to reduce the difference between the retrieved direction and the direction perceived by a listener placed at the location of the array of microphones. It is thereby possible to advise an installer about how to improve the acoustic output of the installation and to resolve minimal positioning errors using information technology, avoiding the installer having to intervene.

According to another embodiment, the threshold value is different for the evaluation of the azimuth and for the evaluation of the elevation.

According to another embodiment, the method further comprises a step of displaying a target direction value of at least one sound source with an indication specifying that the value is fixed by the introduction of a command. An installer, preferably a professional installer, is thereby able to dispense with the recommendations specified by the audio standard and that apply to some loudspeakers, and may decide himself to definitively place them at determined locations.

According to another embodiment, the method comprises a step of displaying an indication representative of the match between the determined positions of the sound sources and the theoretical positions associated with the selected audio standard. A professional installer looking at his communication interface thereby no longer needs to look for precise values, but is able at a glance to see whether his installation is more or less compliant with what is recommended by the audio standard.

According to another embodiment, the method comprises a step of determining the format of the audio content currently being reproduced, said format defining positions of sound sources, and a step of modifying the parameters transmitted to the audio processor in order to create virtual sound sources using the positions of the sound sources using the method as described above. The audio system thereby adapts dynamically depending on each reproduced item of audio content, by creating phantom sources that correspond to the format of the reproduced content.

According to another aspect, the invention relates to a method for configuring an audio system, comprising a step of determining the positions of sound sources using the method described above, and a step of comparing all of the positions of the sound sources with lists of positions associated with standard configurations, the standard configuration whose positions are closest then being selected and used to configure the audio system. The audio system thereby provides the installer with significant help for its configuration.

According to another aspect, the invention relates to an audio system for determining a direction, comprising at least one sound source and an array of microphones capturing the sound emitted by this sound source, a means for emitting a sound by way of the at least one sound source, a means for recording the sound signals received by the microphones, a means for executing cross-correlations between the received signals in order to deduce relative times of arrival therefrom, a means for creating a sinusoidal function of time having a determined frequency and a phase offset dependent on the relative times of arrival, and a means for determining a direction value of the sound source in a spatial reference defined by the array of microphones, using the values computed from the sinusoidal function of time at input, said direction values thus determined being presented on a medium.

5. DESCRIPTION OF THE FIGURES

Figure 5:
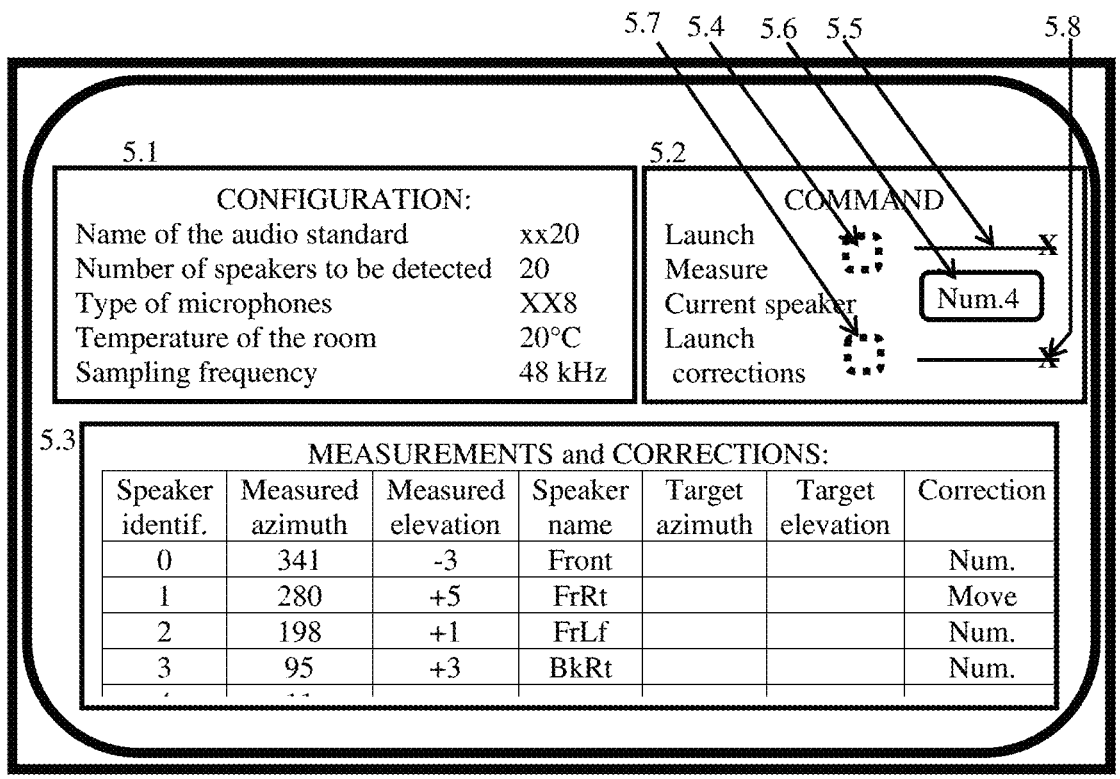
Figure 2:
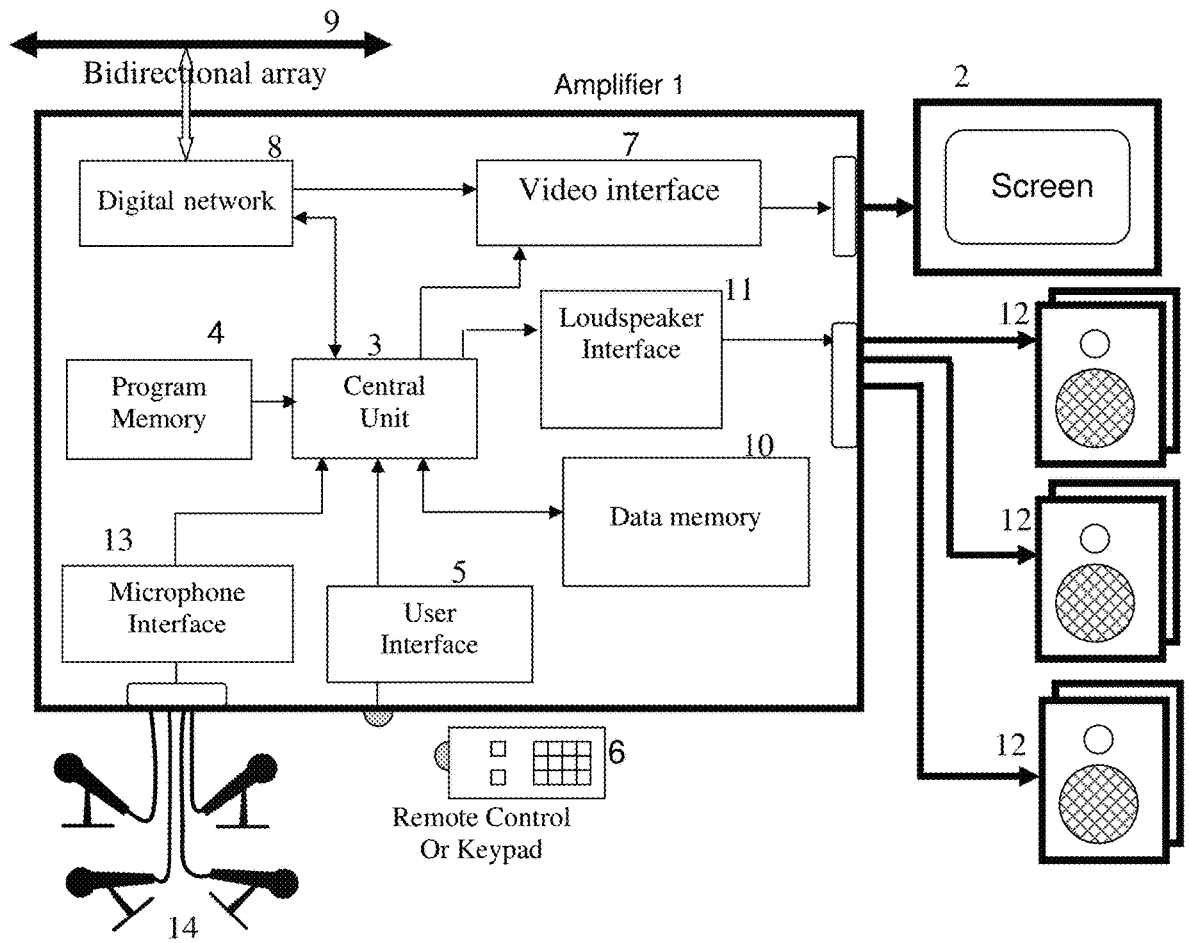
Figure 3:
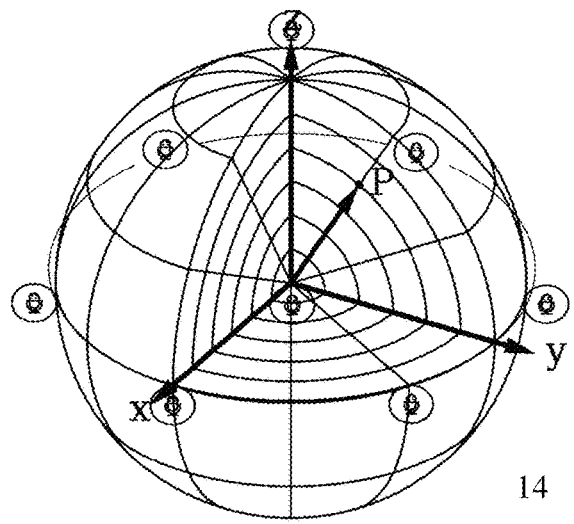
Figure 4:
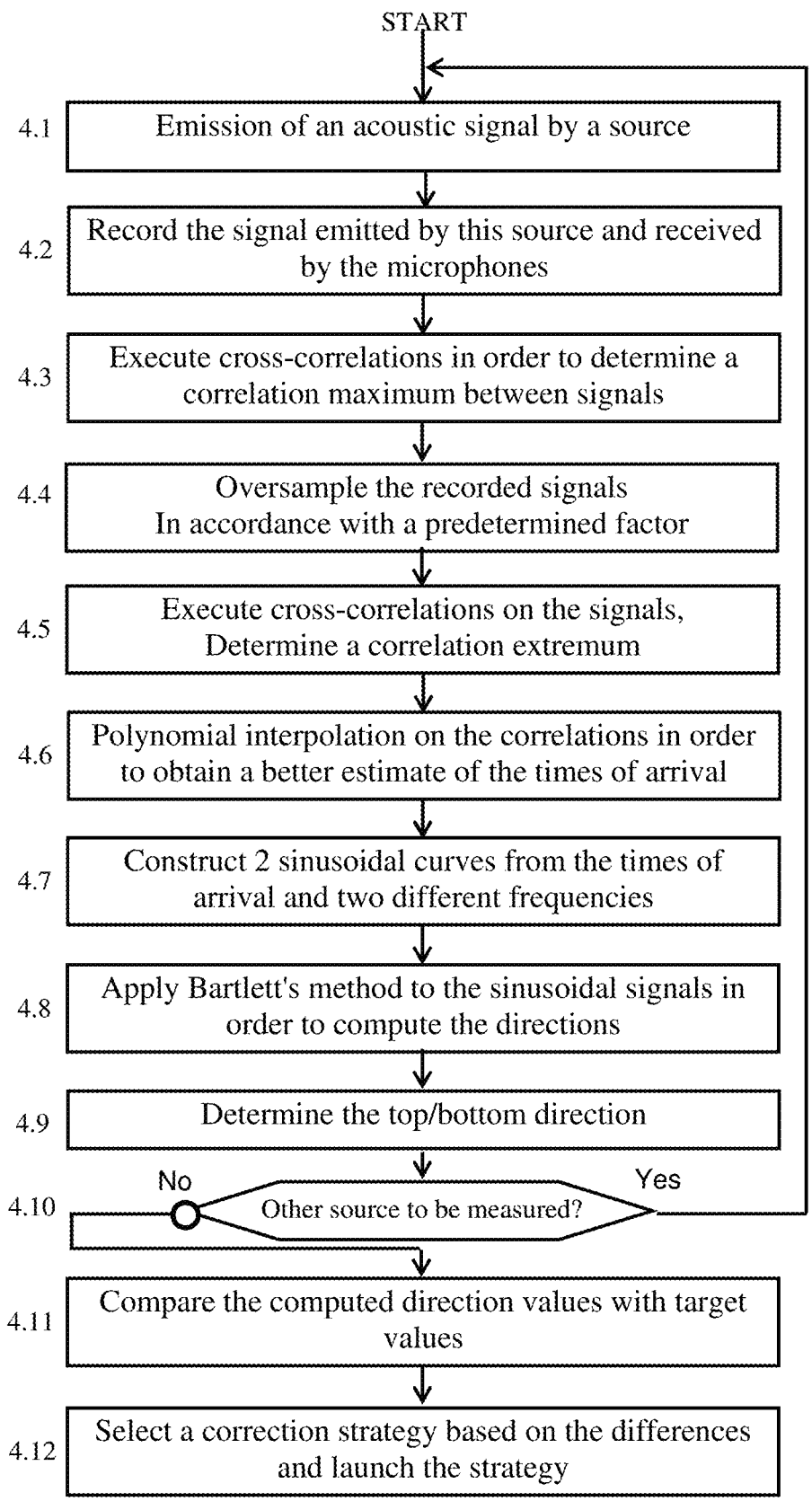

Other features and advantages of the invention will become apparent upon reading the following description, given by way of indicative and non-limiting example, and the appended drawings, in which:

FIG. 1 depicts the emission of sinusoidal acoustic signals as might nowadays be captured by an array of microphones, FIG. 2 depicts one exemplary embodiment of an audio system for determining the direction of at least one sound source, FIG. 3 illustrates one exemplary representation of an array of microphones for capturing the sound emitted by a sound source, FIG. 4 depicts a flowchart of a method for detecting the direction of at least one sound source, according to one exemplary embodiment, and FIG. 5 shows one example of a menu of a user interface for determining the direction of acoustic speakers.

6. DETAILED DESCRIPTION OF ONE EMBODIMENT

6.1 General Principle

The invention relates to a method for determining a direction of a sound source using an audio system capturing the sound emitted by this sound source using an array of microphones. The method comprises the following steps: emitting a sound by way of the sound source and recording the sound signals received by the array of microphones, executing cross-correlations between the received signals in order to deduce relative times of arrival therefrom, creating a sinusoidal function of time having a determined frequency and a phase offset dependent on the relative times of arrival, computing to determine a direction value of the sound source in a spatial reference frame defined by the array of microphones, using the values computed from the sinusoidal function of time at input, presenting the direction value. There are thereby no constraints on the nature of the sound that the sound sources have to emit, and it is possible to use known and proven direction computing methods that are more effective when sinusoidal signals are provided thereto as input parameters.

6.2 Preferred Embodiment

FIG. 2 depicts one exemplary embodiment of an audio system for determining the direction of at least one sound source. This system has an audio amplifier 1 connected to a display device 2, such as a viewing screen or a video projector. The screen is intended in particular to display configuration menus and direction values of acoustic speakers in a 3D space. The audio amplifier 1 is equipped with a central unit 3 connected in particular to a memory 4 containing executable programs, an infrared-signal reception interface 5 for receiving signals from a keypad or a remote control 6, and a video interface 7 for creating visual signals that are sent to the display device 2. The video interface 7 has a text and graphics generation circuit allowing text, graphics and pictograms, superimposed or not superimposed on visual content, to be displayed on the screen. The video interface 7 is controlled by the central unit 3 together with an executable program stored in the memory 4. According to one preferred exemplary embodiment, the audio amplifier 1 is equipped with an interface 8 for communication with a remote server via a digital network 9. This connection makes it possible to receive audio or audiovisual content for reproduction purposes, and configuration data for receiving parameters of audio standards, for example. The communication may take place over a short or long range, for example with a wireless local area network (Wi-Fi or Bluetooth). The remote control or keypad 6 transmits signals to the interface 5 in order to control the operation of the audio amplifier 1, the volume for example. The audio amplifier 1 is also equipped with a data memory 10 for storing configuration data and possibly audio content.

According to one important aspect of the invention, the audio amplifier 1 comprises an audio interface 11 for amplifying analogue signals to a plurality of acoustic speakers 12. According to one variant, the acoustic speakers are powered by the mains and the amplifier 1 delivers a low-power signal. According to another embodiment, the link to the acoustic speakers, wired or radio-based, is digital, the speakers decoding a stream of digital data in order to provide an analogue signal to the loudspeakers.

According to a first embodiment, the audio amplifier 1 comprises an interface circuit 13 with an array of microphones 14 intended to capture ambient sound, and in particular the acoustic signals emitted by the speakers 12. According to this first embodiment, the program memory 4 contains software for determining the direction of the acoustic speakers 12 based on the acoustic signals captured by the array of microphones 14.

According to another embodiment, the array of microphones is connected to a computer that is itself in communication with the amplifier 1. In this case, the array of microphones is connected to an electronic card inserted into the computer, a PC for example, and this electronic card is equipped with inputs of a number at least equal to that of the microphones of the array 14. The computer performs the acoustic measurements by controlling the amplifier 1, computes the directions of the acoustic speakers 12 and transmits any corrections to be applied to the sound signals.

FIG. 3 illustrates a representation of an array of microphones 14 for capturing the sound emitted by at least one sound source, according to one preferred exemplary embodiment. The array has at least four microphones arranged for example at the vertices of a regular tetrahedron, this constituting the most economical solution. Other arrangements are possible, such as the one depicted by FIG. 3, consisting of a ring of 6 microphones distributed at regular intervals over the circumference of a circle, a seventh placed in the centre of this circle and an eighth placed at a height vertically to the seventh. In this embodiment, the radius of the circle is 97 millimetres. This eighth microphone does not contribute to the actual direction computations, but makes it possible to detect the top and the bottom of the array 14, and thus to assign a sign in the elevation value associated with each acoustic speaker. Another arrangement consists in using six microphones distributed regularly over the circumference of a circle, and a seventh placed at a height on the vertical line originating at the centre of the circle. The microphones are preferably omnidirectional with a bandwidth at 3 dB from 100 Hz to 10 kHz.

The exemplary embodiment with 6 microphones produced the best results due to its central symmetry about a vertical axis containing the seventh and the eighth microphone. The tests were performed by positioning the array of microphones 14 4 metres away from the closest acoustic speakers 12, but this value is only indicative, and it is obvious that this distance increases when having a larger room. Generally speaking, the more microphones arranged over the circle, the more the system records small differences and is less sensitive to noise.

After having described the main elements of the measuring device, the way in which these interact will now be explained.

FIG. 4 depicts a flowchart of a method for determining the direction of at least one sound source, according to one exemplary embodiment.

The invention falls for example within the context of an acoustic installation comprising an amplifier and a plurality of loudspeakers, possibly coupled to a screen or a video projector, so as to create a real home cinema.

First of all, an installer positions the acoustic speakers in positions as recommended by the manufacturer of the acoustic installation. Taking a very simple example of an installation equipped with five acoustic speakers, the positions are indicated for example as follows:

| Loudspeaker identifier | Indications recommended by the manufacturer |
|---|---|
| Front centre | 4 metres away, facing the listeners |
| Front left | 30° to the left and to the front, 4.5 m from the listeners |
| Front right | 30° to the right and to the front, 4.5 m from the listeners |
| Upper back left | 45° to the left and to the rear, 4.5 m from the listeners |
| Upper back right | 45° to the right and to the rear, 4.5 m from the listeners |

In step 4.1, the amplifier 1 generates a non-sinusoidal sound towards a first acoustic speaker. Although sinusoidal signals constitute good input parameters for estimating directions using methods such as Bartlett's method, reflections and absorptions due to the environment considerably deform the acoustic signals, but have little impact involving large differences on the wave received directly by the array of microphones. Tests and theory have shown that a non-sinusoidal sound has a good signal-to-noise ratio and produces good results that are independent of the environment. The correlation curves applied to pairs of microphones have a clear peak with this type of signal, thereby allowing better separation of the source and interference. It is also more comfortable for listeners to listen to pink or white noise than a pure sinusoidal signal.

According to one exemplary embodiment, the amplifier 1 is equipped with a pink noise generator. It will be recalled here that pink noise is a random signal whose spectral density is constant per octave band and that its power spectral density is inversely proportional to the frequency of the signal. One of the natural sounds that gets closest to pink noise is that of a stream or a waterfall, produced by random frequencies that add together when larger or smaller amounts of water hit rocks. Such noise is therefore relatively pleasant to listen to.

The noise emitted by this first acoustic speaker is captured by the array of microphones, and recorded in the form of sequences of sound samples (step 4.2). More precisely, the analogue signals transmitted by the microphones are digitized by an A/D converter, and the data thus produced are recorded in the memory 10. Once the data transmitted by each microphone for a given speaker have been recorded, the audio system executes cross-correlations between data coming from pairs of microphones (step 4.3). Cross-correlation is a computation used to determine a value proportional to the degree of correlation of two signals. This consists of a convolution performed between two signals, giving a third signal resulting from the correlation between the two. This third signal has a value that increases, reaches a maximum and decreases when two identical signals are at input. By producing a purely random signal such as white or pink noise, it is observed that the correlation maximum is represented by a sharp and easily detectable peak, since different white or pink noises are completely decorrelated. The cross-correlation is inspired by the method described by Peter D. Welch, but this method is given only by way of example. Tests made it possible to determine that a signal length of 32768 samples and an overlap of 75% are sufficient to stabilize the results.

A first pass is carried out on the signals so as to determine the maximum in the curve of correlation values, between the data coming from a pair of microphones, the maximum of this curve making it possible to compute the relative times of arrival of one and the same acoustic signal captured by a pair of microphones. This first pass is fast since it is performed on a small amount of data, but produces an inaccurate result. It is then necessary to refine the values around the correlation maximum. To this end, in step 4.4, an oversampling step is applied to the recorded data so as to produce more accurate data through interpolation. Tests showed that oversampling of sixteen times to achieve 768 kHz provides good results while not using too much computing time and power. The oversampling starts by inserting fifteen positions between each sample, and initializing them at "0". Next, a low-pass filter with a cutoff frequency of around 20 kHz is applied to the data in order to reconstruct the signal and fill the positions with significant values. In the exemplary embodiment, an FIR filter with 1056 coefficients is used to perform this oversampling.

A second cross-correlation step is then applied to the data obtained by oversampling (step 4.5) in order to determine a value proportional to the degree of correlation between two packets of samples. Applying two cross-correlation steps makes it possible to save time, the first providing rough results that are refined by the second. In step 4.6, a polynomial interpolation is applied to the cross-correlation values in order to obtain a better estimate of the relative times of arrival. In order to achieve an inter-sample resolution, a second-order polynomial is applied to the data resulting from the step of cross-correlating the samples located before and after the maximum. The cross-correlations thereby make it possible to estimate a more accurate inter-sample arrival delay. The relative times of arrival TOA determined at the end of the previous step are used to create a sinusoidal curve for each microphone (step 4.7). It will be recalled that a sinusoidal signal is characterized by its maximum amplitude A and its frequency, and it may be expressed mathematically by the following function:

$$s(t) = A \sin(P \times t + ph).$$

Where: A is the amplitude (unitless), P is the angular frequency of the variable in radians per second, t is the time in seconds, and ph is the phase at the origin (in radians).

The sinusoidal curves are constructed with delays corresponding to the estimated TOAs and are then used as input parameter for an estimate of the DOA using Bartlett's method. Each of these curves is a theoretical model of the sound emitted by the sound source for which it is desired to compute the position and received by a microphone by passing through an environment without any reverberation or absorption. The sinusoidal curves thus created are phase-offset from one another as a function of the relative times of arrival TOA. According to one refinement, two curves are computed and associated with each microphone, one with a first frequency is intended to compute the azimuth, and the other with a second frequency is intended to accurately compute the elevation. Using an array of 8 microphones, tests gave good results using a first frequency of 3400 Hz (+/−5%) and a second frequency of 6400 Hz (+/−5%). The frequencies are determined through the mathematical model of the system under consideration. The sound signals theoretically captured by the microphones and the theoretical position of the sources are known. By varying the construction frequency of the sinusoidal signals at the input of the model, positions of phantom sources introduced into the model are estimated at output. It is then sufficient to compare the position values estimated at these various frequencies and the position values defined in the model in order to determine the frequency that best minimizes the direction estimate errors. The frequencies that maximize the correct simulation behaviour of the system are thereby computed. It may also be noted that the frequency thus determined depends mainly on the geometry of the array of microphones, the model then being simpler in terms of the propagation of acoustic waves (which radiate around the source) and the influence of the environment (only reverberation is taken into consideration).

At this stage, the speed of sound is taken into consideration for better accuracy of the computed data. Specifically, DOA methods are dependent on the speed of sound. Since they use it exponentially to describe the phase decrease between the microphones, a small error in the speed of sound may lead to a poor position estimate. This is why the software asks the installer to indicate the ambient temperature. An equation that computes the speed of sound as a function of ambient temperature is used to adjust the direction vectors. According to one refinement that was not implemented in the prototype, the equation for computing the speed of sound takes into consideration not only temperature, but also humidity and atmospheric pressure.

In step 4.8, Bartlett's method is applied using the characteristics of the two sinusoidal curves created in the previous step. This method for computing DOAs is well known, in particular by virtue of works such as the HAL document "Comparative Study between Several Directions of Arrival, Estimation Method", by Youssef Khmo, Said Safi, Miloud Frikel. This method therefore does not need to be explained any further in this document.

The azimuth value is first computed using all possible pairs of microphones located in one and the same plane. Using the array of microphones as depicted by FIG. 3, seven microphones make it possible to create twenty-one possible pairs. The large number of microphones at the periphery makes it possible to obtain good accuracy for the value of the azimuth, of the order of 2°. Next, the elevation is computed using the same pairs of microphones and another frequency in order to obtain a value with an accuracy of the order of 5°.

The computations executed in steps 4.3 to 4.8 are repeated choosing other pairs of microphones. Each signal captured by a microphone is compared, through cross-correlation, with that of another microphone, and each comparison thus generates a relative delay that may be referenced, without great complexity, to a delay relative to the central microphone, the seventh according to the embodiment depicted by FIG. 2. All of the cross-correlation results are relativized with respect to the central microphone and averaged. All of the signals are thereby combined with one another in all possible ways, producing delays relative to each microphone, and these delays are referenced so as to be relative to the central microphone using the relative delays computed with this central microphone. The last operation consists in averaging the computed values, which are all relative to the central microphone, and thus obtaining the best possible accuracy.

Since all seven microphones are in one and the same plane, this array does not make it possible to determine the top and the bottom. To distinguish this and in step 4.9, use is made of the eighth microphone (according to the embodiment depicted by FIG. 2), which is placed vertically to the plane containing the first microphones, at a height above said plane that is preferably equal to the radius. This microphone does not make it possible to compute a better Bartlett direction vector, since it breaks the central symmetry. However, it creates a right-angled triangle with the seventh microphone and a radius of the circle, which is sufficient to compute an elevation. Determining the top and the bottom makes it possible in particular to add a sign to the elevation value.

In step 4.10, the method tests whether there are still other acoustic speakers 12 whose position is to be determined. If so, then the method loops back to step 4.1 and reprograms the amplifier 1 to generate the same noise towards another acoustic speaker. The loop thus generated makes it possible to sequentially record a set of sequences of sound samples associated with each speaker and intended to compute the position thereof. When all of the speakers have produced a sound, the step of analysing the recorded data may begin. The emission of sound in succession by each speaker thereby takes place in a temporal block, and is more pleasant to listen to. According to one variant embodiment, all of the acoustic signals are emitted by the various sources without analysing their directions, all of the signals are thus recorded and the data are then analysed in order to determine all of the directions of the sound sources. According to another variant, as soon as one set of acoustic signals emitted by one and the same source is recorded, then the signals are analysed and, in parallel, another set of acoustic signals emitted by another source is recorded.

In step 4.11, the azimuth and elevation values that have just been determined are compared with target values specific to the audio standard selected by the installer. The selected audio standard defines the direction (in terms of azimuth and elevation) of each sound source with respect to the location where a listener is supposed to be located.

It is therefore possible to indicate to the installer whether each acoustic speaker is at the correct location or whether he should move it. To this end, the installer selects a reproduction standard on the user interface, and this standard will have to specify the same number of acoustic speakers as that detected by the audio system. Each speaker is referenced by an identifier, which is associated with azimuth and elevation values specified by this audio standard. Here is one example of a table for an installation with five speakers (of course, this number may be significantly greater for high-performance installations):

| Loudspeaker identifier | Measured values | Values of the standard |
|---|---|---|
| Front centre | (2°, 0°) | (0, 0) |
| Front left | (22°, 0°) | (30°, 0°) |
| Front right | (−25°, 0°) | (−30°, 0°) |
| Upper back left | (122°, 0°) | (135°, 0°) |
| Upper back right | (−120°, 0°) | (−135°, 0°) |

The values of the standard are specified by standardization committees in the field of audio systems. The method comprises a step of selecting one standard out of several. According to one variant embodiment, the method proposes a standard recommended by the manufacturer of the audio system implementing the invention.

Once the differences between the computed direction values and the retrieved values have been computed, the method formulates a correction strategy for compensating for positioning errors of the sound sources.

A first strategy consists in creating "phantom" sources. To this end, two to three loudspeakers are used to create a phantom source that a listener locates, through his sense of hearing, at a location where a single acoustic speaker should be located. This illusion is created by broadcasting coherent signals, with a specific gain, on two or three speakers. This principle is identical to that of a stereo panoramic signal, but extended to 3D space. A signal intended for a single acoustic speaker is thereby in fact transmitted with different weightings to two or three speakers located around a target position defined in accordance with the audio standard. A second strategy consists in issuing recommendations to the installer so that he physically moves the acoustic speaker.

Step 4.12 describes the choice between one or the other strategy based on the differences between the computed direction values and the retrieved values. If the difference is above a determined threshold value, the method issues the recommendation to move the acoustic speaker. When the difference is below a threshold value, the amplifier may modify the sound emitted to one or more speakers located approximately in this direction to give the listener the impression that the sound is coming from the target position. According to one refinement, the thresholds for the azimuth and for the elevation are different. For example, if the difference between the computed azimuth value and that of the standard exceeds 10°, then it is recommended to move the speaker. Likewise, if the difference between the computed elevation value and that of the standard exceeds 15°, then it is recommended to move the speaker. It is recommended to move the speaker if one and/or the other of the differences exceeds the corresponding threshold.

FIG. 5 shows one example of a menu displayed on the screen 2 allowing the installer to analyse, for a first time, the direction of the acoustic speakers 12, to receive recommendations to improve listening comfort and thus be closest to an audio standard and to configure his audio system for reproduction purposes.

This menu typically contains:
a configuration window 5.1,
a command and status window 5.2,
a measurement and recommendation presentation window 5.3.

The configuration window 5.1 typically displays, without limitation, the following information:
the name and/or the characteristics of the audio standard,
the number of speakers used by the system,
the type of array of microphones,
the temperature of the environment where the audio system is located,
the sampling frequency of the microphone signals,
the number of samples for the recording.

According to one refinement, the audio system automatically determines the name and/or the characteristics of the audio standard and then configures the audio system with the discovered elements. This determination consists of a step of detecting the position of each sound source in accordance with the method that is the subject of the invention and of a step of comparing all of the positions with lists of parameters associated with standard configurations, of the type for example X1.X2.X3.X4, where: X1 is the number of low-layer sources (level with the ears), X2 is the number of sources dedicated to low frequencies, X3 is the number of sources attached to the walls of the room, and X4 is the number of sources attached to the ceiling. According to this example, the audio system has a library of sets of parameters each associated with an audio standard. The detection step provides the directions and the numbers of sources positioned according to each parameter X1, X2, X3 and X4, these directions and numbers are then compared with those of the audio standards stored in the library and the standard whose numbers are closest is then selected and displayed on the screen in the configuration window 5.1. Other comparison elements may be taken into consideration to determine the closest standard, such as for example the bandwidth of the sources, or the distance from the array of microphones. An icon displayed in the immediate proximity of the identifier of the detected standard allows the user to validate the choice proposed by the audio system, which then configures the various audio streams in accordance with the standard validated by the user. The configuration performed by the user is thereby simplified and the risks of introducing an incorrect standard are limited.

The command and status window 5.2 typically displays an icon 5.4 for launching the determination of the position of each acoustic speaker. A graphical line 5.5 shows a cursor moving along the line indicating the level of progress of the position determination step, and a window 5.6 displays the identifier of the speaker that is currently undergoing computing. An icon 5.7 makes it possible to launch the execution of the issuing of recommendations following a measurement taking phase, and a second graphical line 5.8 shows the progress of the computing of the recommendation.

The measurement and recommendation window 5.3 displays the information relating to each acoustic speaker after the execution of the measuring and recommendation issuing phases in the form of a table. The columns of this table display for example, from left to right:
the identifier of the speaker, for example a number,
the measured azimuth value (in degrees),
the measured elevation value (in degrees),
the name of the speaker with respect to the selected audio standard,
the azimuth value according to this standard,
the elevation value according to this standard,
the type of correction to be made.

The type of correction to be made is either creating a "phantom source" by modifying the signals of the speakers close to this direction (by displaying "Num"), and the user's ear thereby perceives a source coming from a location where a speaker should be located, or asking the installer to move the speaker, since the difference is too large to be compensated for (by displaying "Move"). For as long as the menu recommends movements, it is preferable to perform these and relaunch a measurement in order to check that the movement has actually improved the quality of the sound reproduction.

As has been stated above, this menu may be displayed on a secondary screen 2, and its content is then produced by the amplifier 1. The menu may also be that of a portable computer, communicating with the amplifier 1 and capable of receiving and analysing the sound signals received from the array of microphones 14.

According to one refinement, the menu appearing on the screen when its audio system is configured displays a similarity score representative of the match between the positions of the sound sources detected by the method that is the subject of the invention and the theoretical configuration associated with the audio standard identified in the window 5.1. This similarity score makes it possible to indicate to the user the extent to which the overall positioning of the sources is close to that recommended by the audio standard. The score may be displayed in the form of a grade, varying from 0 to 10, 10 being the value for which the sources are installed in the correct position. The score may also be displayed in the form of a colour code, red signalling incorrect positioning, orange signalling perfectible refinement and green signalling correct positioning. According to one variant, this colour code may be applied to each sound source and displayed individually for each row of the table appearing in the window 5.3. According to the example displayed by FIG. 5, the row associated with source number 1 whose recommendation is a movement appears in red. The user may thereby easily view the score corresponding to his installation and iteratively improve it. A maximum score thus ensures the best sound quality level in relation to a choice of audio standard.

Other icons are possible for introducing other commands, such as those of removing a speaker, or adding one, introducing the degree of humidity, atmospheric pressure, etc. According to another refinement, the user may decide to fix the position (azimuth and elevation) of one or more sound sources and thus to no longer take into consideration the positions specified by the audio standard that is identified in the window 5.1 appearing in FIG. 5. This refinement allows the user to introduce his own corrections without taking into consideration those resulting from the stream decoded by the audio processor. A professional installer is thereby able to dispense with the recommendations specified by the audio standard for some loudspeakers and decide himself to place them at determined locations. Since the user decides to deviate from the audio standard, the similarity score is therefore no longer meaningful and is no longer displayed. The target azimuth and target elevation values that appear in the table in the window 5.3 and that correspond to positions fixed by the user are displayed with a graphical feature such as: underlining, flashing or a particular colour. According to another refinement, when reproducing audio content, the audio system adapts its audio processor (or "codec") based on the format of the audio document and on the position of the sound sources detected by the method as described above. It will be recalled that a codec is a hardware or software device for encoding or decoding a digital data stream with a view to reproduction or storage. The format of the audio content to be reproduced specifies the position of sound sources. The audio system creates phantom sources such that they are located virtually at the positions defined by the format, and modifies the parameters sent to the codec based on the real position of the loudspeakers. This step of reprogramming the audio processor with a view to creating phantom sources is performed each time sound content is reproduced, and a specific display may then appear, indicating for example the number of phantom sources.

An exemplary embodiment of the present application avoids one or more of the drawbacks of the prior art by providing a method for determining the direction of a sound source, while using a noise that is more pleasant to listen to than a sinusoidal sound, and while improving the accuracy of the data defining the direction of the sources.

Although the present invention has been described with reference to the particular embodiments illustrated, it is in no way limited by these embodiments, but rather is limited only by the appended claims. It will be noted that changes or modifications may be made by those skilled in the art.

The invention claimed is:

1. A method comprising:
  determining a direction of at least one sound source using an audio system capturing by an array of microphones sound emitted by the at least one sound source, the determining comprising:
  emitting the sound by way of the at least one sound source and recording sound signals received by the array of microphones,
  performing with at least one processing device:
  executing cross-correlations between the received sound signals in order to deduce relative times of arrival therefrom,
  creating a sinusoidal function of time having a determined frequency and a phase offset dependent on the relative times of arrival,
  computing to determine a direction value of the at least one sound source in a spatial reference frame defined by the array of microphones, using values computed from the sinusoidal function of time at input, and
  presenting the direction value.

2. The method according to claim 1, wherein the direction value comprises an azimuth datum and an elevation datum.

3. The method according to claim 2, wherein the computing to determine the azimuth datum uses sinusoidal signals only of a first frequency at input, and the computation to determine the elevation datum uses sinusoidal signals of a second frequency at input.

4. The method according to claim 3, wherein the first frequency is in an interval between 3000 Hz and 3800 Hz, and the second frequency is in an interval between 6000 Hz and 6800 Hz.

5. The method according to claim 1, wherein the executing cross-correlations between the signals received from the microphones comprises a first step of cross-correlation over an entire duration of the recording in order to deduce a correlation maximum value therefrom, and a second step of cross-correlation around the correlation maximum value using oversampled data obtained from the recording of the sound signals.

6. The method according to claim 1, wherein the computing to determine a direction value comprises Bartlett's method.

7. The method according to claim 5, wherein the method comprises a polynomial interpolation step executed after the first and second cross-correlation steps and comprising applying a second-order polynomial to data resulting from the step of cross-correlating applied to samples of the sound that are located before and after the correlation maximum value.

8. The method according to claim 1, wherein the method comprises determining a top and a bottom, using an additional microphone located outside a plane in which the other microphones are located.

9. The method according to claim 1, wherein the sound emitted by the at least one sound source is a white or pink noise.

10. The method according to claim 1, wherein the method comprises:
selecting an audio standard that defines the direction of at least one sound source with respect to a location where a listener is supposed to be located,
retrieving target positions of each sound source, associated with the selected audio standard,
computing a difference between the computed direction values and the retrieved target positions and comparing the difference with a threshold value,
selecting a strategy depending on whether the value of the difference is less than or greater than the threshold value, said strategy aiming to reduce a difference between a retrieved direction and a direction perceived by a listener placed at a location of the array of microphones.

11. The method according to claim 10, wherein the direction value comprises an azimuth datum and an elevation datum, and wherein the threshold value is different for evaluation of the azimuth and for evaluation of the elevation.

12. The method according to claim 10, wherein the method comprises displaying a target direction value of the at least one sound source with an indication specifying that the target direction value is fixed by introducing a command.

13. The method determining a direction according claim 10, wherein the method comprises displaying an indication representative of a match between a determined position of the at least one sound source and theoretical positions associated with the selected audio standard.

14. The method according to claim 1, comprising:
reproducing an audio content by:
determining a format of the audio content currently being reproduced, said format defining a position of the at least one sound source, and
modifying parameters transmitted to an audio processor in order to create at least one virtual sound source using a position of the at least one sound source based on the computed direction value.

15. The method according to claim 1, wherein the at least one sound source comprises a plurality of sound sources and the method comprises:
configuring the audio system by:
determining positions of the plurality of sound sources;
comparing all of the positions of the plurality of sound sources with lists of positions associated with standard configurations;
selecting the standard configuration whose positions are closest; and
using the selected standard configuration to configure the audio system.

16. A audio system for determining a direction, the audio system comprising:
at least one sound source;
an array of microphones capturing sound emitted by the at least one sound source;
at least one central unit;
at least one non-transitory computer readable medium comprising instructions stored thereon which when executed by the at least one central unit configure the audio system to execute a method of determining the direction, comprising:
emitting the sound by way of the at least one sound source and recording sound signals received by the array of microphones,
performing with at least one processing device:
executing cross-correlations between the received sound signals in order to deduce relative times of arrival therefrom,
creating a sinusoidal function of time having a determined frequency and a phase offset dependent on the relative times of arrival,
computing to determine a direction value of the at least one sound source in a spatial reference frame defined by the array of microphones, using values computed from the sinusoidal function of time at input, and
presenting the direction value.

* * * * *